United States Patent [19]

Kunzfeld

[11] Patent Number: 4,483,184

[45] Date of Patent: Nov. 20, 1984

[54] AUTOMATIC DIAGNOSTIC DEVICE FOR A FOUR-STROKE-INTERNAL COMBUSTION ENGINE

[75] Inventor: Wilhelm Kunzfeld, Graz, Austria

[73] Assignees: AVL Gesellschaft fur Verbrennungskraftmaschinen und Messtechnik M.B.H.; Prof.Dr.Dr.h.c.Hans List, both of Graz, Austria

[21] Appl. No.: 492,175

[22] Filed: May 6, 1983

[30] Foreign Application Priority Data

May 12, 1982 [AT] Austria ................................. 1874/82

[51] Int. Cl.³ ............................................. G01M 15/00
[52] U.S. Cl. .................................................. 73/117.2
[58] Field of Search .................... 73/117.2, 117.3, 116; 364/551

[56] References Cited

U.S. PATENT DOCUMENTS 4,050,297 9/1977 Pettingell et al. .................. 73/117.2
4,295,363 10/1981 Buck et al. .......................... 73/117.3

FOREIGN PATENT DOCUMENTS 285993 11/1970 Austria .

Primary Examiner—Jerry W. Myracle
Attorney, Agent, or Firm—Watson, Cole, Grindle & Watson

[57] ABSTRACT

Three impulse transmitters are provided of which one co-acts with an impulse mark on the flywheel, another with an impulse mark on the camshaft drive wheel and a third with the teeth of the ring gear on the flywheel of the engine. The impulse mark on the flywheel enables a precise determination of a reference angle position of the crank drive and the impulse mark on the camshaft pinion by triggering a window enables correct association within the working cycle which covers 720° of crank-angle. The time spacing and amplitude of the triggered window are controlled by the tooth sequence on the ring gear.

6 Claims, 6 Drawing Figures

AUTOMATIC DIAGNOSTIC DEVICE FOR A FOUR-STROKE-INTERNAL COMBUSTION ENGINE

BACKGROUND OF THE INVENTION

The present invention relates to an automatic diagnostic device for a separately driven, four-stroke-internal combustion engine with a flywheel mounted on the crankshaft, a camshaft driven by a pinion via the crankshaft and a ring gear on the flywheel for co-action with a starter pinion, comprising a measuring device for the detection and indication of a specific reference angular position of the crank drive, in particular of the ignition, top dead-center of a specific cylinder.

DESCRIPTION OF THE PRIOR ART

In known diagnostic devices of the kind specified a periodic reference signal corresponding to a specific reference angular position of the crank drive, which alone enables an unequivocal identification to be made of engine events which recur at the periodicity of the crank drive and which may be measured in various ways, for example in accordance with Austrian Pat. No. 285 993, is obtained by means of a firing impulse of a specific cylinder derived from the ignition system, for example from the ignition coil or from the injection pump. However, in the context of the engine-speed-related or load-related adjustment of ignition or injection timing which is customary in modern internal combustion engines the known device has the serious disadvantage that the indicated reference angular position of the crank drive is also subject to such adjustment and does not remain constant, which makes it very difficult, if not altogether impossible to arrive at an unequivocal diagnosis of the tested engine event.

SUMMARY OF THE INVENTION

It is an aim of the present invention to improve a device of the kind specified in that reference signals are obtained which are unequivocally correlated with the crank drive and correspond to specific angular reference positions while assuring, for a simple and therefore inexpensive construction of the device, a high degree of accuracy and reproduceability.

This objective is achieved, according to this invention, by the provision of three impulse transmitters of which a first impulse transmitter is arranged in the region of the flywheel which in a region thereof co-acting with said transmitter has an impulse mark in a known angular position relative to the reference angular position to be determined, and of which a second impulse transmitter is arranged in the region of the driving pinion of the camshaft which latter is also provided in that region thereof which co-acts with said transmitter with an impulse mark in a known angular position relative to the reference angular position to be determined, and of which a third impulse transmitter is arranged in the region of the ring gear on the flywheel and, co-acting with the gear teeth thereof, issues an impulse sequence which corresponds to the gear pitch, and that the impulse transmitters are connected with a processor unit which further processes the signal issued by the first transmitter within a window triggered by the signal of the second transmitter as the measured signal which corresponds to the looked-for reference angle, in particular to the ignition, top dead-centre, and suppresses this signal outside the window, the middle of the window having a spacing interval in the region of 720° less the spacing interval between the appearance of the pulses from the first and second transmitters measured in degrees of crank angle relative to the triggering impulse and the spacing interval as well as the time width of the window being controlled by the impulse sequence of the third impulse transmitter. In other words, the periodic reference signal which indicates a specific reference angle position of the crank drive is taken, in a very simple manner quite unaffected by potentially interfering influences, from the flywheel which is on the crankshaft. However, since with a four-stroke combustion engine a working cycle is completed only after a crank angle of 720°, that is to say after two complete rotations of the crankshaft, a distinction as to whether the reference signal corresponds to the desired reference angle position or is angularly offset relative thereto by 360° crank angle can only be made if an identifying signal is provided which repeats at the period of the desired reference event, that is to say, for example the ignition, top dead-center, of a specific cylinder, and according to the present invention this identifying signal is provided by the impulse transmitter which is arranged in the region of the driving wheel of the camshaft. Accordingly, with the aid of impulses which have the correct periodicity and come from the driving wheel of the camshaft a window is triggered in the processor unit within which window the impulses from the flywheel on the crankshaft are accepted and further processed as a reference signal corresponding to the specific reference angle position.

In principle, of course, the desired identification of the specific reference angle position of the crank drive is already made possible by the impulse sequence of the second impulse transmitter on the driving wheel of the camshaft, but, in view of the fact that the revolution rate of the camshaft is only half that of the flywheel, and in view of the substantially smaller diameter of the camshaft driving wheel by comparison with the flywheel as well as due to inevitable variations in the camshaft drive which is transmitted from the crankshaft, the accuracy, in the determination of a specific reference angle position, such as particularly the firing point of a specific cylinder, is substantially inferior when working with just one single impulse transmitter on the camshaft than when working with the described arrangement according to this invention.

A further development of the invention provides that the number of impulses from the third impulse transmitter which determine the width of the window and/or the separating interval between trigger pulses of the second impulse transmitter and opening of the window is adjustable in the processor unit. The impulse sequence of the third impulse transmitter which reflects the tooth pitch of the ring gear on the flywheel and which, as already described, is used to control the window in the processor unit, may thereby be adjusted in the number of impulses determining the opening and closing times of the window and this allows in a very easy manner due consideration to be accorded to the various arrangements of the impulse transmitters needed for different types of engines. Since different arrangements particularly of the first and second impulse transmitters entail different angular positions of the impulse marks relative to the reference angle position which is to be determined, a facility for taking into account these different conditions is needed if the diagnostic device is to be used for testing different types of internal combustion engines. The aforedescribed provisions enable this to be done in a very simple and easy manner.

According to a further embodiment of the present invention a measuring system is associated with the processor unit to determine the crank-angle interval between the appearance of impulses from the first transmitter and of impulses from the second transmitter, and this measuring system is connected with a comparator device for comparing the measured interval with an ideal value, said comparator device being connected to an indicator or evaluator device. These provisions, in combination with the earlier described arrangement of the three impulse transmitters provides in a very simple fashion the facility of reliably automatically detecting accidentally phase-staggered assembly of the camshaft driving wheel by one or even more teeth relative to the flywheel which may very well happen in the assembly of the internal combustion engine, because, when the camshaft wheel is correctly mounted, there is for a given arrangement of the first and second impulse transmitters a known phase shift between the appearance of the impulses from the first and the second transmitter from which any deviation can be easily measured with the aid of the described device. In other words, even prior to the actual test run with the ready-mounted engine it is possible to ascertain whether or not the position of the camshaft correlates correctly with the crank drive.

In further development of the present invention the above described measuring system, or device may comprise a pulse-multiplier, which multiplies the pulse sequence of the third transmitter and a counter device, the number of pulses from the third transmitter counted in the counting device between the appearance of associated pulses from the first and second transmitter being comparable in the comparator device with a corresponding ideal value. This represents a simple facility for improving the accuracy of the measuring system for the determination of the crank-angle interval between the impulse mark on the flywheel and on the drive wheel of the camshaft and by means for the value of such multiplication it is also possible to achieve a degree of accuracy which allows the detection of deviations corresponding to a mere fraction of the tooth pitch of the camshaft driving wheel. Such deviations may occur, for instance, if a gear belt which transmits drive to the camshaft fails to mesh with the teeth of the associated input or output gearwheel but simply rests on the top of the gear teeth in the manner of a flat driving belt.

According to yet another further development of this invention a time-measuring device may be provided in the measuring system for determining the crank-angle interval between the appearance of the pulses from the first and second transmitters this time-measuring device being adapted to be started by the appearance of a pulse from one of the two transmitters and to be stopped by the appearance of the respectively associated pulse from the other transmitter, and the measured time may then be compared with a reference value in a comparator device. Such an arrangement also affords a very easy way of detecting potential deviations in the relative angular positions of camshaft and crankshaft.

In a further attractive embodiment the present invention provides that the processor unit comprises a device for determining the pulse-recurrence times of the pulses supplied by the third transmitter and an inverse-value-forming unit whereby the respective time intervals of the pulses in the pulse sequence provided by the third transmitter at the ring gear can be converted into instantaneous values of the angular velocity of the flywheel, and that successive instantaneous values can be checked in a pitch-testing unit associated with said inverse-value-forming unit for rising or falling tendency, and that the falling instantaneous values within the time space of first windows set by means of the processor unit can be added together by means of a summation unit and similarly the rising instantaneous values within the time space of second windows of this kind can be added together and can be stored in memory stores associated with said summation unit for further processing, the opening and closing of said windows as well as their respective time widths being controlled by the pulse sequence of the third impulse transmitter and the sequence being able to be started in unvarying sequence for each cycle of the internal combustion engine with the specific reference angle position, in particular the ignition, top dead-centre of a specific cylinder.

These provisions, applied in conjunction with the arrangement of the three impulse transmitters according to this invention, afford a very simple and accurate method of measuring relative compression of the individual cylinders of the engine.

It is known, for example from the earlier mentioned Austrian Pat. No. 285 993, that conclusions as to the compression ratios in the individual cylinders may be drawn by monitoring the variations in engine speed of an extraneously driven internal combustion engine. During the compression stroke of a leaking cylinder the reduced resistance opposing piston movement will result in an increase in the speed of rotation which can be measured and evaluated in the context of its relative position in the crank-angle diagram. However, since variations in the speed of rotation of an internal combustion engine which is extraneously driven for measuring operations of this kind may be caused not only by the compression performance in the individual cylinders but may also be due, for example to the flexible coupling means which must be provided between the driving motor and the engine under test in order to allow such measuring operations, the known apparatus for measuring relative compression always gave rise to problems regarding the evaluation of the measured speed variations which correctly reflected the actual conditions because the processor units were not designed to take the above mentioned circumstances into account. With the aid of the arrangement according to this invention with two groups of windows controlled through the processor unit, in which in one of these groups only the increasing and in the other group only the decreasing instantaneous values of rotation or angular velocity of the flywheel are added together, it is possible in a simple manner to arrange, for a given diagnostic device, that interferencesof the described nature will be excluded and a clear and unequivocal evaluation of relative compression in the individual cylinders becomes actually possible.

DESCRIPTION OF THE DRAWINGS

The present invention is hereinafter more particularly described with reference to the examples of embodiments thereof illustrated in the drawings and explanatory diagrams.

DESCRIPTION OF THE PREFERRED EMBODIMENT

Figure 1:
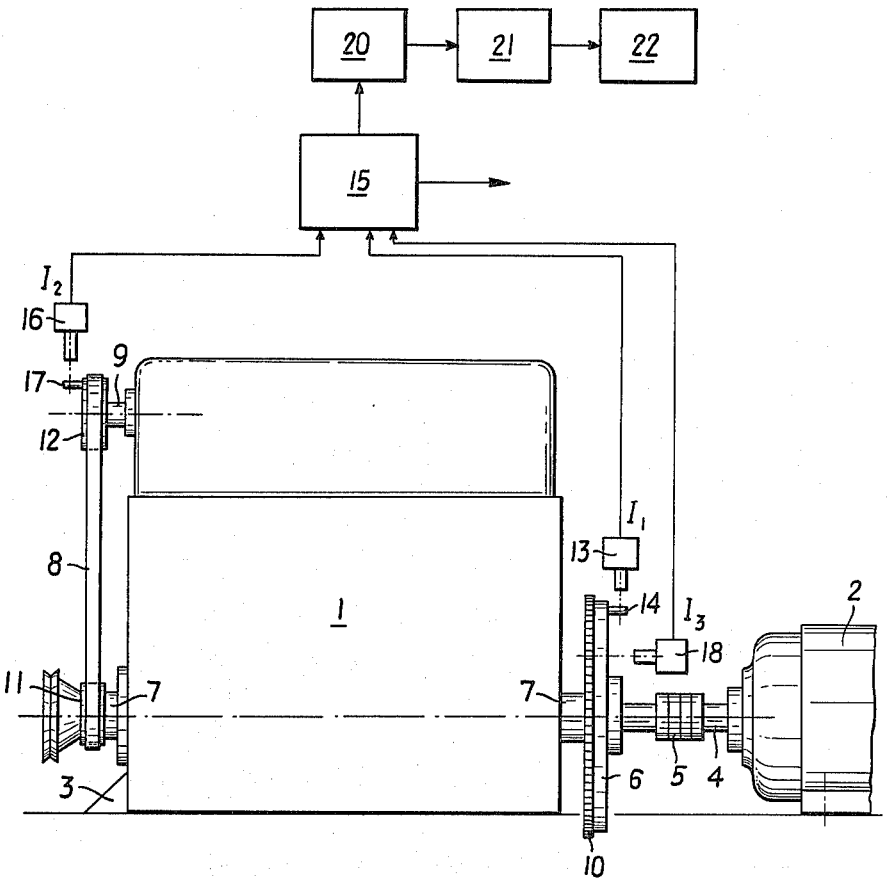
FIG. 1 is a schematic representation of a device according to the present invention.

FIG. 1 schematically represents a multi-cylinder, four-stroke internal combustion engine 1 which, for example after completed assembly, or at any rate after assembly of the crank and cam drive, is driven by a separate extraneous drive, here an electric motor 2, for automatic diagnostic testing. The mountings of the engine 1 are merely schematically indicated and generally designated by the number 3. The electric motor 2 is rotationally coupled with the flywheel 6 of engine 1 by means of a drive shaft 4 with an intervening flexible coupling 5, the crankshaft 7, which is connected with the flywheel 6, transmits drive, by means of a toothed belt 8 to a camshaft 9 which in this example is arranged overhead.

The flywheel 6 carried a ring gear 10 for meshing engagement with a starter pinion (not shown); the toothed belt 8 is driven by a pinion 11 which is mounted on the opposite end of the crankshaft 7 relative to the flywheel 6 and transmits drive to the camshaft 9 through a drive wheel 12 which has double the number of gear teeth of the pinion 11 so that the number of revolutions of camshaft 9 is half that of crankshaft 7.

For detecting and indicating a specific reference angular position of the crank drive, in particular of the top dead-center near which ignition occurs, for a specific cylinder, there are provided three impulse transmitters, of which a first transmitter 13 is arranged in the region of the flywheel 6, which latter, in a region thereof which co-acts with said transmitter 13 shows an impulse mark 14 in a known angular position relative to the reference angular position to be determined, which for each revolution of flywheel 6 and thus for every 360° crank angle co-acts once with transmitter 13 to send an impulse $I_1$ to a processor unit 15. A second impulse transmitter 16 is arranged in the region of the driving pinion 12 for the camshaft 9 and also provided with an impulse mark 17 in a known angular position relative to the reference angle position to be determined, in that region thereof which co-acts with said second transmitter 16, and which, due to the described associations with the crank drive and in cooperation with the transmitter 16 sends an impulse $I_2$ to the processor unit 15 for every 720° of crank angle. A third impulse transmitter 18 is arranged in the region of the ring gear 10 on flywheel 6 and co-acts with the teeth of this ring gear 10 to send an impulse sequence $I_3$ corresponding to its gear pitch to processor unit 15.

Figure 2:
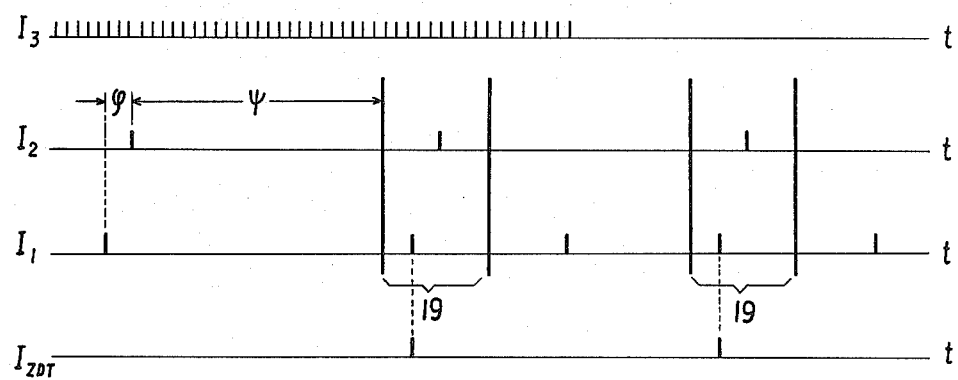
FIG. 2 is an impulse sequence diagram for the device shown in FIG. 1.

The modus operandi of the illustrated device will be more specifically described with reference to the impulse-sequence diagram in FIG. 2: Within the processor unit 15 (FIG. 1) the signals $I_2$ from transmitter 16 (FIG. 1) open up a window 19 which is situated at a predetermined distance in time or crank-angle ($\psi$), and within which the signal $I_1$ from the first transmitter (13 in FIG. 1) is further processed as test signal $I_{ZOT}$ corresponding the desired reference angle, in particular to the firing top center point, while outside this window the signal $I_1$ is suppressed. The middle of said window 19 has a time or angle spacing interval in the region of 720° less the interval ($\psi$) between the appearance of the impulses from the first and second transmitters in degrees of crank angle relative to the trigger pulse $I_2$. Both, the interval ($\psi$) and the width of the window 19 are controlled by the impulse sequence $I_3$ of the third transmitter (18 in FIG. 1).

In as much as the relative angular position of the impulse mark 14 on the flywheel 6 relative to the desired reference angular position of the crank drive can be very accurately fixed and reproduced it is possible with the aid of the device according to this invention to obtain a reference signal which very accurately characterises the tested event. The signal sequence $I_2$ which, due to the smaller diameter, the lower revolution rate and the indirect drive transmission from the crankshaft is far less accurately correlated with the crank drive itself, merely serves to provide a window in the processor unit within which window the signals $I_1$, which as such occur once for every 360° of crank angle, are accepted and further processed as the looked-for reference signals.

The processor unit 15 itself is adapted, in a manner not here particularly discussed, to enable adjustment of the number of impulses $I_3$ which are counted between the appearance of signals $I_2$ and the opening or closing of the windows 19 so that it is quite easy to allow for variations in the disposition and relative angular positions of the individual impulse transmitters which may occur in internal combustion engines of different types.

FIG. 1 also schematically illustrates a measuring system 20 for determining the crank angle interval or distance between the appearance of impulses $I_1$ from the first transmitter and of impulses $I_2$ from the second transmitter, which system is connected to the processor unit 15. The measuring system 20 is also associated with a comparator device 21 whereby the measured crank-angle interval is compared with an ideal value of predetermined magnitude for a specific relative angular position of the transmitters 13 and 16 or of the angle marks 14 and 17. The comparator device 21 is further connected to an indicator or processor unit 22 which indicates or further processes the result of the comparison.

This affords an easy way of detecting an angular shift or offset of camshaft 9 relative to the crankshaft which may occur, for example, in the event of a phase shift in the gear teeth of pinion 12 relative to the toothed belt 8. For improved accuracy in respect of angle resolution in such an arrangement the measuring system may further comprise either an impulse multiplier (not shown) which multiplies the impulse sequence of the third transmitter, and a counter device, and the number of multiplied impulses $I_3$ from the third transmitter between the appearance of associated impulses $I_1$ and $I_2$ from the other two transmitters which has been counted in the counter device being then adapted to be compared in the comparator device 21 with a corresponding preset ideal value, or else a time-measuring device (equally not shown) may be provided in the measuring system 20 which could be started by the appearance of an impulse ($I_1$ or $I_2$) and could be stopped by the appearance of the associated, respective, other impulse, the time thus measured being then compared in the comparator device 21 with a predetermined time value. In this manner it is also possible to detect an angular shift between crank-shaft 7 and camshaft 9 which is smaller than the tooth pitch of the toothed belt 8, a situation which may occur, for example, if the belt simply rests on top of the teeth.

How a device according to the present invention may also be used for measuring relative compression in the cylinders of an internal combustion engine will be hereinafter more particularly described with reference to FIGS. 3 to 6, as applied to a four-cylinder engine.

Figure 3:
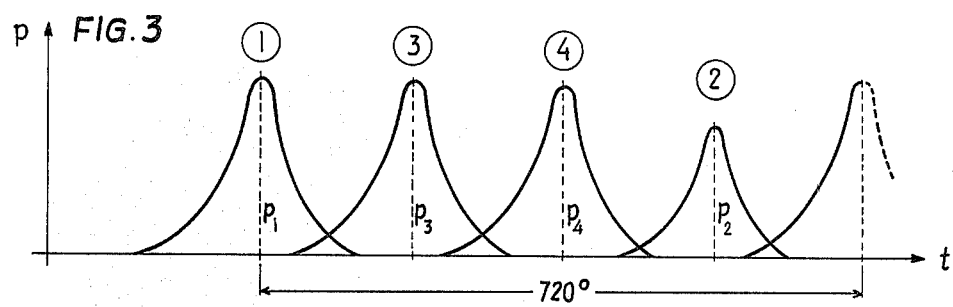
FIG. 3 is an example of compression pressure diagrams of a four-cylinder internal combustion engine, obtained with the aid of pressure pick-ups.

FIG. 3 shows typical pressure diagrams in the firing sequence of the cylinders as measured in each case with a separate pressure pick-up for each cylinder. The encircled numbers are the cylinder numbers; plotted above time t is here a complete cycle of the four-cylinder internal combustion engine—that is to say corresponding to 720° of crank angle. It will be seen from the cylinder pressures p of the individual cylinders plotted in this figure that in the illustrated example compression in cylinder 2 is less than in the other cylinders which represents a harmful functional fault or malfunction of the internal combustion engine.

However, since the measuring of compression in the individual cylinders according to FIG. 3 requires separate pressure-measuring for each cylinder—which means the awkward fitting of a separate pressure pick-up device and therefore also a risk of pollution in the interior space of the cylinder—it is desirable to provide a device for at least determining relative compression in the cylinders one with another which enables measurements to be taken in a simple manner and entails no risks of potential engine pollution.

Figure 4:
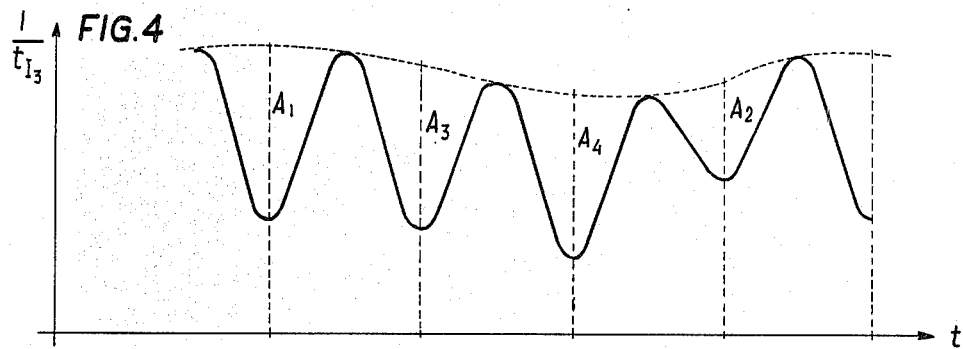
FIG. 4 is an angular velocity diagram corresponding to FIG. 3.

When testing extraneously-driven engines without use of the ignition system angular velocity at the crank-shaft fluctuates at low revolution rates in a specific relationship with the compression pressures of the individual cylinders which can be explained by the variations in the resistance offered to the extraneous drive in the presence of differential compression in the individual cylinders. The amplitudes of these angular velocity variations could be used as a relative measure for the respective compression pressures. Such a diagram, in which is also plotted the variation in angular velocity of the flywheel in form of the inverse value of impulse-recurrence time $t_{I3}$ against time t (could also be replaced by crank angle), is shown in FIG. 4 which refers to the same internal combustion engine as FIG. 3. It is clearly obvious that the reduced compression pressure p in cylinder 2 according to FIG. 3 is expressed here, in FIG. 4, in a smaller decrease of angular velocity of the flywheel in the associated crank-angle position. The contour-line, shown in dashes or dots, also shows that the reduced compression in cylinder 2 virtually affects the whole crank-angle cycle for which reason the amplitudes A1 to A4 of angular velocity variations must also be measured from this contour line.

The angular velocity diagram of FIG. 5 corresponds substantially also to the situation described with reference to FIG. 4; the significant difference here resides in that between the drops in angular velocities which are typical for the compression processes in the individual cylinders there occur additional plunges in angular velocity which in this case are caused by a flexible coupling arranged between the extraneous driving motor and the internal combustion engine under test and of which the resonant vibrations influence the angular velocity diagram in this fashion.

Figure 5:
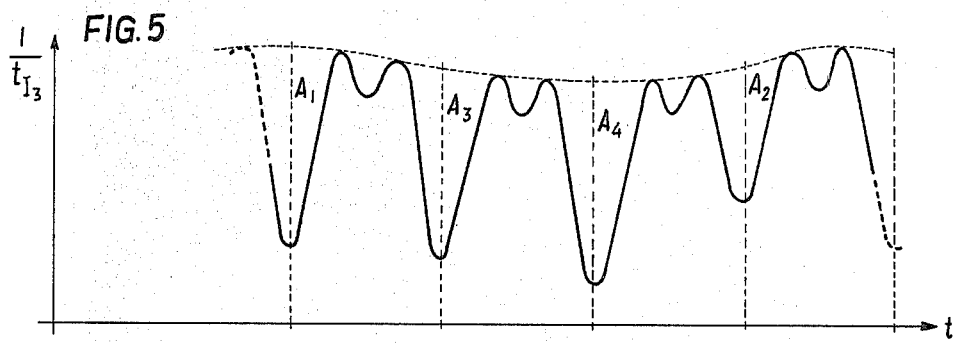
FIG. 5 is an angular velocity diagram corresponding to FIG. 4 with the provision of a flexible coupling between the extraneous driving motor and the tested internal combustion engine.
Figure 6:
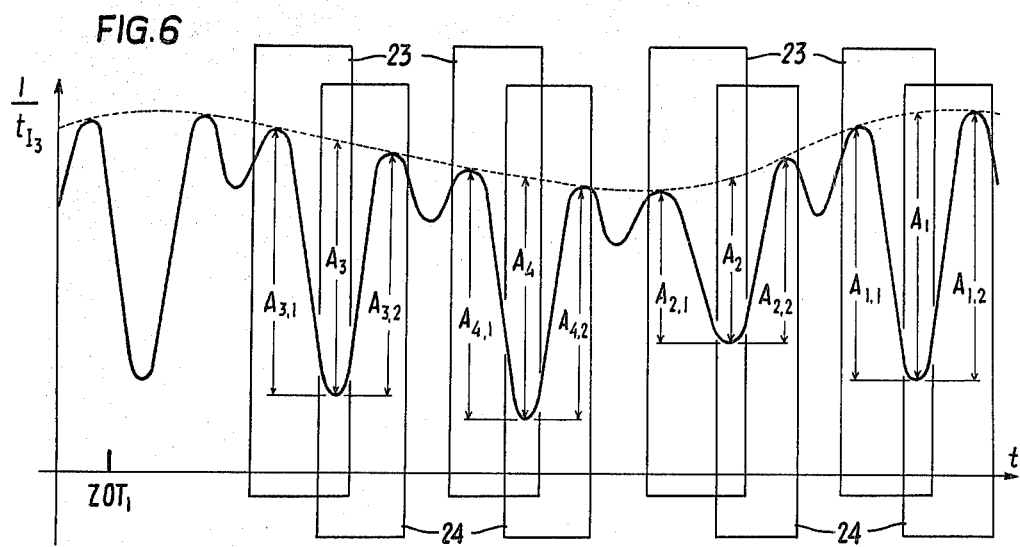
FIG. 6 is an angular velocity diagram corresponding to FIG. 5 showing the electronic windows which are adapted to be controlled by the processor unit according to the present invention.

With a view to enabling the angular velocity-curves according to FIG. 4 as well as according to FIG. 5 to be evaluated for the purposes of determination of relative compression in the individual cylinders the processor unit according to the present invention provides the facility of using time-windows the function of which will be more particularly understood by referring to FIG. 6.

First, however, we would briefly refer to the means or devices which are required for measuring and recording the illustrated angular velocity curves: referring to FIG. 1, this is the processor unit 15 which to this end comprises additionally a device for the determination of the impulse sequence times $t_{I3}$ in respect of the impulses $I_3$ issued by the third impulse transmitter 18, and an inverse-value-forming device by means of which the respective time intervals of the impulses $I_3$ which are issued by transmitter 18 on ring gear 10 are convertible into instantaneous values of the angular velocity of the flywheel 6. Furthermore, a pitch-checking device which is connected with the inverse-value-forming device, is provided in which successive instantaneous values of the angular velocity of the flywheel can be tested for falling, or rising tendency. By means of a summation unit the falling instantaneous values are added together within the time-range or amplitude of first windows 23 (FIG. 6) which are controlled via the processor unit 15 while the rising instantaneous values are added up within the time-range of second windows 24 of this type and fed into memory stores connected to the summation unit for further processing. The times of opening and closing the windows 23, 24 as well as their respective amplitude or extension in time are controlled by means of the impulse sequence $I_3$ of the third transmitter 18, the arrangement being such that the triggering of these windows in constant sequential order occurring for each cycle of the internal combustion engine at the reference angular position obtained in accordance with FIG. 2—here the ignition, upper dead-center of the first cylinder ($ZOT_1$).

Since in the aforedescribed manner only the falling instantaneous values of the angular velocity of the flywheel are added up within windows 23 it is easy to obtain the amplitude $A_{1,1}$ to $A_{4,1}$ and correspondingly easy to obtain the amplitudes $A_{1,2}$ to $A_{4,2}$ by means of the windows 24. By the simple process of forming mean values this provides the looked-for amplitudes A1 to A4 which serve as a measure of the relative compression in the individual cylinders. By calculation of an arithmetical mean value of amplitudes A1 to A4 and comparing this with the actually measured amplitudes it is possible, giving certain tolerances, to obtain direct "good/bad" reports in respect of the compression in the individual cylinders.

Concerning the arrangement or disposition of the transmitters 13, 16, 18 and associated impulse marks 14, 17 shown schematically in FIG. 1 it should further be mentioned that on the one hand the transmitters themselves may be mounted or secured at a convenient point either on the engine itself or on surrounding parts of a testing device, and that, on the other hand, the impulse marks may likewise be arranged at convenient points—provided only that their angular position relative to the desired reference angles is known.

The three impulse transmitters which are used in the proposed device may be of any type desired, all known arrangements of this kind being conceivable, provided only that they are capable of feeding corresponding electric signals into the processor unit. By way of example only are mentioned those impulse transmitters which operate on the light-barrier principle or those which use the variable inductance of a coil caused by a correspondingly designed impulse mark moving past such a coil, to provide a measuring signal. Corresponding considerations apply in respect of the other component parts of the processor unit all of which, considered on their own merits, are prior art and may be realized in terms of hardware as well as of software.

I claim:

1. An automatic diagnostic device for a separately driven, four-stroke-internal combustion engine with a crankshaft and a flywheel mounted thereon, a camshaft driven by said crankshaft and a ring gear on said flywheel for co-action with a starter pinion, said diagnostic device comprising a measuring device for the detection and indication of a specific reference angular position of said crankshaft, said measuring device comprising three impulse transmitters, of which a first impulse transmitter is arranged in the region of said flywheel which in a region thereof co-acting with said first transmitter has an impulse mark in a known angular position relative to said reference angular position to the determined, of which a second impulse transmitter is arranged in the region of a driving pinion mounted on said camshaft which latter is also provided in that region thereof which co-acts with said transmitter with an impulse mark in a known angular position relative to said reference angular position to be determined, and of which a third impulse transmitter is arranged in the region of said ring gear of said flywheel and, co-acting with the gear teeth thereof, issues an impulse sequence which corresponds to the gear pitch, said measuring device further comprising a processor unit to which said impulse transmitters are connected and which further processes the signal issued by said first transmitter within a window triggered by the signal of said second transmitter as the measured signal which corresponds to the looked-for reference angle and suppresses said signal outside said window, the middle of said window having a spacing interval in the region of 720° less the spacing interval between the appearance of the impulses from the first and second transmitters measured in degrees of crank angle relative to the triggering signal of said second transmitter, and the spacing interval as well as the width of said window being controlled by the impulse sequence of said third transmitter.

2. A device according to claim 1, wherein the number of impulses from said third transmitter which determines the width of said window and the interval between trigger pulse of said second transmitter and opening of said window is adjustable in said processor unit.

3. A device according to claim 1, wherein a measuring system is provided and associated with said processor unit for determining of a crank-angle interval between appearance of impulses from said first transmitter and of impulses from said second transmitter, where a comparator device is associated with said measuring system for comparison of the measured crank-angle interval with an ideal value, and wherein an indicator device and further analyzer and processor device is connected to said comparator device.

4. A device according to claim 3, wherein said measuring system comprises an impulse multiplier which multiplies the pulse sequence of said third transmitter, and a counter device, and wherein the number of pulses from said third transmitter, which is counted in said counter device between the appearance of associated pulses from said first and second transmitters is compared with a corresponding ideal value preset in said comparator device.

5. A device to claim 3, wherein a time-measuring device is provided in said measuring system, said time-measuring device is adapted to be started by the appearance of an impulse from one of said first and second transmitters and to be stopped by the appearance of an associated impulse from the respectively other transmitter, and wherein the time thus measured is compared with a predetermined time value in said comparator device.

6. A device according to claim 1, wherein said processor unit further comprises a device for the determination of the pulse-recurrence times of the pulses supplied by said third transmitter and an inverse-value-forming unit whereby the respective time-intervals of the impulses in the sequence provided by said third transmitter at said ring gear are convertible into instantaneous values of the angular velocity of said flywheel, a pitch-testing unit associated with said inverse-value-forming unit, wherein successive instantaneous values are checked for falling or rising tendency, a summation unit and memory stores, and wherein the falling instantaneous values are added together within the time space of first windows set by means of said processor unit and the rising instantaneous values are added together within the time space of second windows of this kind by means of said summation unit and stored in said memory stores associated with said summation unit for further processing, the opening and closing of said windows as well as their respective time widths being controlled by the pulse sequence from said third transmitter and able to be started in unvarying sequence for each cycle of the internal combustion engine with the specific reference angle position.

* * * * *

UNITED STATES PATENT AND TRADEMARK OFFICE
CERTIFICATE OF CORRECTION

PATENT NO. : 4,483,184
DATED : Nov. 20, 1984
INVENTOR(S) : Wilhelm Kunzfeld

It is certified that error appears in the above-identified patent and that said Letters Patent is hereby corrected as shown below:

In the title page, assignee should read:
--Assignee: AVL GESELLSCHAFT FUR VERBRENNUNGSKRAFTMASCHINEN UND MESSTECHNIK M.B.H., Prof. Dr.Dr.h.c. Hans List, Graz, AUSTRIA--

Signed and Sealed this

Twenty-third Day of April 1985

[SEAL]

Attest:

DONALD J. QUIGG

*Attesting Officer*     *Acting Commissioner of Patents and Trademarks*